(12) United States Patent
Ramaswamy et al.

(10) Patent No.: US 6,668,178 B1
(45) Date of Patent: Dec. 23, 2003

(54) BATTERY-BACKUP MECHANISM FOR BASE UNIT OF WIRELESS TELEPHONE SYSTEM

(75) Inventors: Kumar Ramaswamy, Indianapolis, IN (US); Paul Gothard Knutson, Indianapolis, IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/581,191
(22) PCT Filed: Sep. 1, 1998
(86) PCT No.: PCT/US98/18106
§ 371 (c)(1),
(2), (4) Date: Nov. 16, 2000
(87) PCT Pub. No.: WO99/31860
PCT Pub. Date: Jun. 24, 1999
(51) Int. Cl.[7] .................................................. H04B 1/38
(52) U.S. Cl. .................... 455/572; 455/573; 455/343.6; 455/462; 455/463
(58) Field of Search ................................ 455/462, 463, 455/464, 465, 572, 573, 574, 343.1, 343.6; 320/103, 164, 165; 379/413, 433.08

(56) References Cited

U.S. PATENT DOCUMENTS 5,578,875 A * 11/1996 Dormer et al. ............... 307/66
5,596,626 A * 1/1997 Nakayama ................... 455/462
5,801,513 A * 9/1998 Smith et al. ................. 320/113
5,912,514 A * 6/1999 Stendardo et al. ............ 307/64
6,044,280 A * 3/2000 Muller ......................... 455/572
6,173,170 B1 * 1/2001 Komoda ...................... 455/407

FOREIGN PATENT DOCUMENTS

GB 2279827 1/1995 ............. H02J/7/02

OTHER PUBLICATIONS

European Search Report Dated Nov. 23, 1998.

* cited by examiner

Primary Examiner—Edward F. Urban
Assistant Examiner—Sonny Trinh
(74) Attorney, Agent, or Firm—Joseph S. Tripoli; Harvey D. Fried; Joseph J. Kolodka

(57) ABSTRACT

A wireless telephone system comprises one or more wireless handsets and a base unit. Each handset has a handset transceiver and a rechargeable handset battery for powering the handset. The base unit has a base transceiver for communicating over an RF channel with each handset via its handset transceiver; a recharge cradle for physically docking a docked handset battery comprising one of a detached handset battery and a handset; and a recharge unit for recharging the docked handset battery. The base unit is coupled to an AC power supply and utilizes the docked handset battery as a backup power supply if AC power from the AC power supply is lost or irregular to prevent communication between the base unit and the handsets from being disrupted.

21 Claims, 1 Drawing Sheet

BATTERY-BACKUP MECHANISM FOR BASE UNIT OF WIRELESS TELEPHONE SYSTEM

BACKGROUND OF THE INVENTION

1. Field of the Invention

The present invention relates to multi-line wireless telephone systems and, in particular, to techniques for ensuring communications despite power losses and irregularities.

2. Description of the Related Art

The use of telephones and telephone systems, including wireless telephone systems, is widespread. In wireless telephone systems, one or more cordless or wireless telephone handset units communicate via either analog or digital radio signals with a base unit, which is typically connected via a standard telephone line to an external telephone network. In this manner, a user may employ the wireless handset to engage in a telephone call with another user through the base unit and the telephone network.

Multi-line wireless telephone systems are also in use in various situations, such as businesses with many telephone users. Such systems employ a handset that communicates with up to N handsets simultaneously, typically with digital communications schemes, such as a spread-spectrum, time division multiple access (TDMA). In a TDMA system, a single RF channel is used, and each handset transmits and receives data during a dedicated time slice or slot within an overall cycle or epoch. Efficient power use is important for a wireless system since the handsets are typically battery-powered. The base unit typically requires more power to operate than the handsets, and is thus usually powered by an external AC power supply. Irregularities may occur in the AC power, such as a loss of power or momentary power spikes or glitches, which can cause communications to be disrupted. For example a power glitch may cause a loss of TDMA synchronization.

UK Patent App. No. GB 2 279 827, published Nov. 1, 1995, discloses a base unit which recharges a batter on a battery-powered portable unit (such as a cordless telephone handset) via a first current source and a first port, can simultaneously recharge a spare batter pack for the portable unit via a second current source and second port, and a back power supply switch can connect the spare battery to provide power to the base unit on failure of an external power source which normally provides the power to the base unit and for charging the batteries.

SUMMARY

A wireless telephone system comprising one or more wireless handsets and a base unit. Each handset has a handset transceiver and a rechargeable handset battery for powering the handset. The base unit has a base transceiver for communicating over an RF channel with each handset via its handset transceiver; a recharge cradle for physically docking a docked handset battery comprising one of a detached handset battery and a handset; and a recharge unit for recharging the docked handset battery. The base unit is coupled to an AC power supply and utilizes the docked handset battery as a backup power supply if AC power from the AC power supply is lost or irregular to prevent communication between the base unit and the handsets from being disrupted.

DESCRIPTION OF THE PREFERRED EMBODIMENT

Figure 1:
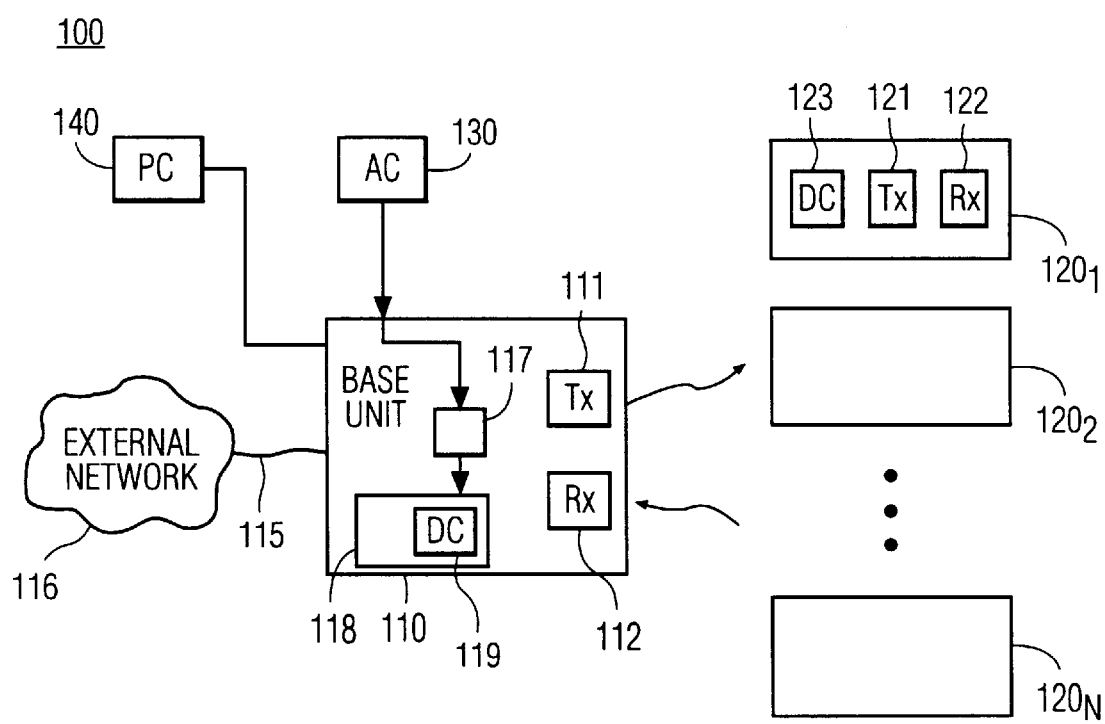
FIG. 1 is a block diagram of TDMA multi-line wireless telephone system, in accordance with an embodiment of the present invention.

Referring now to FIG. 1, there is shown a block diagram of spread spectrum TDMA multi-line digital wireless telephone system 100, in accordance with an embodiment of the present invention. TDMA system 100 comprises a base unit 110, which has receiver and transmitter units 112 and 111, respectively, and is coupled to external telephone network 116 via telephone line(s) 115. Base unit 110 is normally powered by AC power supply 130. Base unit 110 also comprises recharge unit 117, and recharge cradle 118, which is a port or docking station for receiving either a wireless handset having a battery 119, or a detached handset battery 119. Recharge unit 117 is driven by AC power in and provides DC power to power base unit 110 and/or to recharge any battery 119 placed in cradle 118 via contacts provided in cradle 118 which electrically couple with contacts in either the docked handset or on the docked battery 119 itself.

System 100 also comprises N wireless handsets $120_1$, $120_2$, ... $120_N$. Each has a transmitter and receiver unit (transceiver), such as transmitter 121 and receiver 122 of handset $120_1$. Each handset also comprises a rechargeable battery 123. In one embodiment, receiver unit 112 comprises N logical receivers, and transmitter unit 111 comprises N logical transmitters, so that receiver and transmitter units 112 and 111 provide N logical transceiver units, one for each of N wireless handsets. At any given time, M handsets ($0 \leq M \leq N$) are operating or active (i.e., in the process of conducting a telephone call).

The telephone system provided by system 100 preferably operates in the 900 MHz unlicensed band, and preferably provides features like that of a small PBX, in conjunction with PC 140. In one embodiment, system 100 employs a combination of time division multiplexing (TDM), such as TDMA, and frequency band selection to overcome interfering sources and to maintain reliable links between the base-station and the handsets. In a digital TDMA scheme, each handset only transmits or receives data during its own "time slice" or slot. System 100 thus provides a wireless network between the base station 110 and each handset $120_1$ ($1 \leq i \leq N$). In one embodiment, N=4, so that system 100 comprises a maximum of 4 wireless handsets, each having unique time slots in the TDMA epoch dedicated thereto.

As explained above, it is undesirable for communications to be disrupted if the power provided to base unit 110 by AC power supply 130 is lost or has momentary glitches or other irregularities. In the present invention, therefore, base unit 110 is configured to draw power from DC supply 119 as a backup supply in the event that AC power is irregular or lost.

Often there is a battery 119 physically docked in cradle 118, which is either fully recharged or in the process of being recharged. For example, a detached or solo battery may have been placed in cradle 118 previously by a user to charge up an extra handset battery. The detached battery may be used by recharging the battery, and then ejecting a spent battery in a given handset and replacing it with the recharged handset battery; at this point, the spend detached handset batter may be recharged. Alternatively, one of handsets $120_1$ may not be in use and may have been placed in cradle 118. Whether a detached handset battery is directly docked in cradle 118 or a handset having a battery is docked in cradle 118, cradle 118 contains a docked handset battery 119. For this reason, at any given moment, there may be a battery 119 docked in cradle 118 that has a charge sufficient to power base unit 110 for some length of time. Therefore, in one embodiment, base unit 110 is configured to draw power from a battery 119 in its recharge cradle 118, if the battery is present and has a minimum charge, and if there is a loss of or irregularity in AC power provided to base unit 110.

For example, handset $120_1$ may be docked with a fully charged battery 123 (also battery 119) in cradle 118, and not in use. Handsets $120_2$ and $120_3$ may be engaged in TDMA communication with base unit 110. If an AC power glitch or power loss is detected by base unit 110, base unit 110 draws DC power from battery 119 (i.e., battery 123 of docked handset $120_1$). This allows communications with handsets $120_2$, and $120_3$ to continue undisrupted and to ride out momentary AC power glitches or losses, unless AC power loss is not restored before battery 119 is drained by the relatively heavy power use of base unit 110. In addition, the backup battery power provided in this manner is "free" since no separate battery dedicated to charging only the base unit is necessary, and the base unit 110 takes advantage of an available recharged battery that is not currently being used by a handset and that would otherwise go to waste without the power backup technique of the present invention. As will be appreciated, if there is no battery 119 docked in cradle 118 (or if any battery docked therein is not sufficiently charged to power base unit 110), then communications would be disrupted if AC power is lost or irregular. Thus, the base unit power backup feature of the present invention is preferably optional and is made functional only when a sufficiently charged battery 119 is detected in cradle 118.

In one embodiment, as soon base unit 110 detects that AC power is lost and begins to draw on DC power from battery 119, a signal is sent to all handsets (or all off hook handsets) to notify them that the base unit has experienced AC power failure and is in backup mode. This can alert any user to investigate AC power failure and to restore it if possible, and also to alert users that communication may soon be lost if the backup power is drained before AC power is restored.

In another embodiment, base unit 110 comprises a locking mechanism designed to make removal of battery 119 more difficult or impossible whenever base unit 110 is in backup mode. This will prevent a user from accidentally removing battery 119 and thus depriving base unit 110 of operating power, when AC power has failed. For example, in normal operation, a user is free to manually insert or remove a battery 119 or handset having battery 119 into or out of cradle 118. In one embodiment, cradle 118 comprises a solenoid-actuated locking mechanism that activates only when base unit 110 enters backup mode, which prevents manual removal of battery 119 unless the user depresses an unlocking switch. This allows a user to remove a battery 119 if necessary, but causes the user to consider whether to do so since the user must depress the unlock switch first.

In a system having only a single handset, if the handset itself is docked in cradle 118, then there may be no need to use its battery as a back up since there is no communication in progress while the handset is being recharged. Conversely, when the handset is engaged in communication with the base unit, it is not docked in the recharge cradle 118 so its battery cannot be used for backup purposes. However, in the case where a solo battery 119 is being recharged in recharge cradle 118 (e.g., an extra battery for the handset), then base unit 110 may resort to battery backup to prevent disruption of communication with the single handset.

In an alternative embodiment, battery 119 is not one of the handset batteries but is a base unit rechargeable battery dedicated solely to provide backup battery power to base unit 110. In this embodiment, battery 119 may be recharged as long as there is AC power, by the same recharging unit 117 that recharges handset batteries when handsets are docked in cradle 118. In this case, battery 119 may be larger in power storage capacity than the typical batteries employed in handsets $120_1$, to account for the fact that base unit 110 has a much higher power consumption than handsets.

In an alternative embodiment, base unit 110 comprises multiple cradles identical to cradle 118, so that more than one handset or solo batter may be recharged at a time.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A wireless telephone system, comprising:
   (a) one or more wireless handsets, each handset having a rechargeable handset battery for powering the handset; and
   (b) a base unit for communicating over an RF channel with each handset, the base unit further being coupled to a source of AC power supply and comprising a recharge cradle for physically docking a docked handset battery for recharging the docked handset battery, and for providing power from the docked handset battery to the base unit in response to an irregularity in the AC power, characterized in that the base unit further comprises means for transmitting a notification signal to the one or more wireless handsets, if the base unit utilizes the docked handset battery as a backup power supply, to notify the one or more wireless handsets that an irregularity in the AC power has been detected.

2. The system of claim 1, wherein the one or more wireless handsets comprises a plurality of wireless handsets.

3. The system of claim 2, wherein: each handset comprises a handset transceiver; the base unit comprises a base transceiver for communicating with each handset via its handset transceiver; and the base transceiver comprises means for establishing a time-division multiple access (TDMA) link over a shared RF channel with each handset via the handset transceiver in accordance with a TDMA epoch for allocating exclusive audio packet time slots to each handset.

4. The system of claim 2, wherein the recharge cradle is for physically docking a handset of the plurality of wireless handsets and a rechargeable handset battery of the docked handset, wherein the docked handset battery comprises the rechargeable handset battery of the docked handset.

5. The system of claim 1, wherein the one or more wireless handsets comprises a single handset and the docked handset battery comprises a detached handset battery.

6. The system of claim 1, wherein the base unit comprises a plurality of recharge cradles.

7. The system of claim 1, wherein the base unit comprises means for activating a locking mechanism in the recharge cradle, if the base unit utilizes the docked handset battery as a backup power supply, for hindering removal of the docked handset battery from the recharge cradle unless a user activates an unlocking switch.

8. A method for maintaining power for a base unit of a wireless telephone system, the wireless telephone system further comprising one or more wireless handsets, the base unit comprising a base transceiver, a recharge cradle, and a recharge unit, each handset comprising a handset transceiver and a rechargeable handset battery for powering the handset, the method comprising the steps of:

(a) communicating with each handset via the base transceiver and the handset transceiver;

(b) physically docking with the recharge cradle a docked handset battery comprising one of a detached handset battery and a rechargeable handset battery (c) recharging the docked handset battery with the recharge unit, wherein the base unit is coupleable to a source of AC power;

(d) detecting, with the base unit, an irregularity in the AC power; and (e) utilizing the docked handset battery as a backup power supply for the base unit in response to the detection of irregularity in the AC power; characterized in that the method comprises the further step of:

(f) transmitting a notification signal to the one or more wireless handsets, if the base unit utilizes the docked handset battery as a backup power supply in step (e), to notify the one or more wireless handsets that an irregularity in the AC power has been detected.

9. The method of claim 8, wherein the one or more wireless handsets comprises a plurality of wireless handsets.

10. The method of claim 9, wherein the base transceiver establishes a time-division multiple access (TDMA) link over a shared RF channel with each handset via the handset transceiver in accordance with a TDMA epoch allocating exclusive audio packet time slots to each handset.

11. The method of claim 9, wherein the recharge cradle physically docks a handset of the plurality of wireless handsets and a rechargeable handset battery of the docked handset wherein the docked handset battery comprises the rechargeable handset battery of the docked handset.

12. The method of claim 9, wherein the one or more wireless handsets comprises a single handset and the docked handset battery comprises a detached handset battery.

13. The method of claim 9, wherein the base unit comprises a plurality of recharge cradles.

14. The method of claim 8, wherein, if the base unit utilizes the docked handset battery as a backup power supply then the base unit activates a locking mechanism in the recharge cradle that hinders removal of the docked handset battery from the recharge cradle unless a user activates an unlocking switch.

15. A base unit for communicating with one or more wireless handsets, each handset comprising a handset transceiver and a rechargeable handset battery for powering the handset, the base unit comprising:

(a) a base transceiver for communicating over an RF channel with each handset via its handset transceiver;

(b) a recharge cradle for physically docking a docked handset battery comprising one of a detached handset battery and a rechargeable handset battery; and (c) a recharge unit for recharging the docked handset battery, wherein the base unit is coupleable to an AC power supply and utilizes the docked handset battery as a backup power supply if AC power from the AC power supply is irregular; characterized by the base unit further comprising:

(d) means for transmitting a notification signal to the one or more wireless handsets, if the base unit utilizes the docked handset battery as a backup power supply, to notify the one or more wireless handsets that an irregularity in the AC power has been detected.

16. The base unit of claim 15, wherein the one or more wireless handsets comprises a plurality of wireless handsets.

17. The base unit of claim 16, wherein the base transceiver comprises means for establishing a time-division multiple access (TDMA) link over a shared RF channel with each handset via the handset transceiver in accordance with a TDMA epoch for allocating exclusive audio packet time slots to each handset.

18. The base unit of claim 16, wherein the recharge cradle is for physically docking a handset of the plurality of wireless handsets and a rechargeable handset battery of the docked handset, wherein the docked handset battery comprises the rechargeable handset battery of the docked handset.

19. The base unit of claim 15, wherein the one or more wireless handsets comprises a single handset and the docked handset battery comprises a detached handset battery.

20. The base unit of claim 15, further comprising a plurality of recharge cradles.

21. The base unit of claim 15, wherein the base unit comprises means for activating a locking mechanism in the recharge cradle, if the base unit utilizes the docked handset battery as a backup power supply, for hindering removal of the docked handset battery from the recharge cradle unless a user activates an unlocking switch.

* * * * *